(12) United States Patent
Monnier (10) Patent No.: US 8,503,439 B2  
(45) Date of Patent: Aug. 6, 2013

(54) FRAME SWITCHING DEVICE

(75) Inventor: Stephane Monnier, Boulogne Billancourt (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 12/674,683

(22) PCT Filed: Sep. 3, 2008

(86) PCT No.: PCT/EP2008/061622  
§ 371 (c)(1), (2), (4) Date: Aug. 2, 2010

(87) PCT Pub. No.: WO2009/030706  
PCT Pub. Date: Mar. 12, 2009

(65) Prior Publication Data  
US 2010/0284313 A1    Nov. 11, 2010

(30) Foreign Application Priority Data  
Sep. 3, 2007  (FR) ...................... 07 57312

(51) Int. Cl.  
*H04Q 11/00*   (2006.01)

(52) U.S. Cl.  
USPC ........................................................... 370/384

(58) Field of Classification Search  
USPC .................................. 370/468, 384, 376, 434  
See application file for complete search history.

(56) References Cited

U.S. PATENT DOCUMENTS

| | | | |
|---|---|---|---|
| 6,539,023 B1 * | 3/2003 | Bartholomay et al. | 370/412 |
| 7,072,350 B2 * | 7/2006 | Dooley et al. | 370/416 |
| 7,689,677 B2 * | 3/2010 | Hickey et al. | 709/220 |
| 7,885,250 B2 * | 2/2011 | Whittaker | 370/350 |
| 2005/0147029 A1 * | 7/2005 | Gambardella et al. | 370/218 |

FOREIGN PATENT DOCUMENTS

| | | |
|---|---|---|
| EP | 1 309 130 A1 | 5/2003 |
| EP | 1 533 289 A2 | 10/2005 |

OTHER PUBLICATIONS

Jérôme Grieu, "Analyse et évaluation de Techniques de commutation Ethernet pour l'interconnexion des systèmes avioniques", XP-002484726, Sep. 24, 2004.

AFDX Protocol tutorial, ARINC, AFDX/ARINC 664 Tutorial; (1500-049), XP-002429136, May 1, 2005.

Seifert Rich, "The switch book: The complete guide to LAN Switching Technology, passage", XP-002429138, Jan. 1, 2000, pp. 539-541.

\* cited by examiner

*Primary Examiner* — Chandrahas Patel  
(74) *Attorney, Agent, or Firm* — Oblon, Spivak, McClelland, Maier & Neustadt, L.L.P.

(57) ABSTRACT

A frame switching device for an AFDX network, the device including a first port, configured to be connected to a frame switch of the network or else to a terminal, for example a computer, and a plurality of second ports configured to be respectively connected to on-board pieces of equipment. Each frame incident on the first port is replicated on each of the second ports. The second ports are periodically polled in turn, each frame present on a second polled port being transferred onto the first port.

8 Claims, 10 Drawing Sheets

FRAME SWITCHING DEVICE

TECHNICAL FIELD

The present invention relates to the field of on-board networks and more particularly to a frame switching device for connecting together a plurality of on-board pieces of equipment and/or to an AFDX (Avionics Full Duplex Switched Ethernet) network.

STATE OF THE PRIOR ART

Safety is a major concern in designing aircraft. In particular, it is absolutely necessary to ensure the integrity of certain types of measurement data, considered as critical for flying the aircraft. Among these data, mention may be made of those relating to the positioning of the aircraft or further those giving the remaining amount of fuel. These data are generally transmitted by sensors to computer(s), by means of an on-board network. Vice versa, a computer may transmit a flying command to actuators, via such a network.

Figure 1:
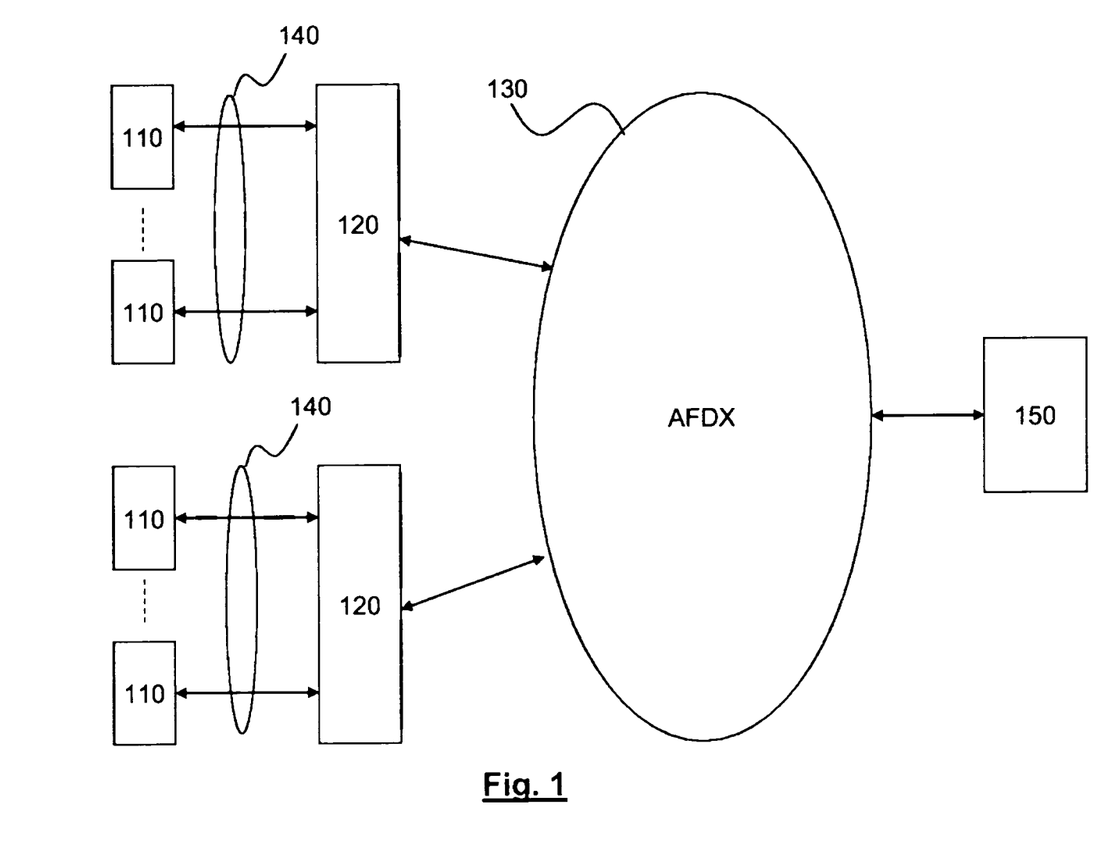
FIG. 1 illustrates an architecture for connecting a plurality of pieces of equipment to the AFDX network, as known from the state of the art.

FIG. 1 illustrates a known architecture allowing a plurality of pieces of equipment 110 to emit and/or to receive data via an AFDX (Avionics Full Duplex Switched Ethernet) network. This equipment may be sensors transmitting measurement data to on-board computers 150 or else actuators receiving set data from such computers.

The pieces of equipment 110 are connected to concentrator devices 120 by means of a connection network 140 which may be a so-called <<field bus>>, for example a CAN bus, well-known in the automotive field or else further a network of the Arinc 429 type. The concentrator devices are themselves connected to the AFDX network for transmitting and/or receiving the data from or to the different pieces of equipment. They play the role of conversion gateways between the connection network, 140 and the AFDX network, 130.

It is recalled that the AFDX network, developed for the needs of aeronautics is based on a switched Ethernet network. In a switched Ethernet network, each terminal, source or addressee is individually connected to a frame switch and the switches are connected together through physical links. The AFDX network resorts to the notion of a virtual link defined as an oriented path of level 2 through the network, stemming from a source terminal and serving one or a plurality of addressees. An addressee terminal of a virtual link is said to be a subscriber to this link.

The AFDX network was subject of standardization in the Arinc 664 standard, part 7. A description of the AFDX network will notably be found in the document entitled <<AFDX protocol tutorial>> available under the URL http://sierrasales.com/pdfs/AFDXTutorial.pdf and a presentation of virtual links can be found in FR-A-2832011 filed in the name of the present applicant. It will be simply recalled here that the AFDX network is full-duplex, deterministic and redundant.

By full-duplex, it is understood that each terminal may simultaneously transmit and receive frames on virtual links. The AFDX network is deterministic, in the sense that the virtual links exhibit guaranteed characteristics in terms of latency bound, of physical segregation of flows, of bandwidth and throughput. Each virtual link for doing this has a reserved path from end to end through the network. Finally, the AFDX network is redundant since the underlying Ethernet network is duplicated for reasons of availability. The data are transmitted as encapsulated IP packets in Ethernet frames. Unlike conventional Ethernet switching (using the Ethernet address of the addressee), the switching of frames on an AFDX network uses a virtual link identifier included in the frame header. When a switch receives a frame on one of its input ports, it reads the virtual link identifier and determines from its switching table the output port(s) over which it should be transmitted. The switches check on the fly the integrity of the transmitted frames without however requesting retransmission if a frame is erroneous: the frames detected as erroneous are removed. The frames in transit over a virtual link are numbered sequentially. Upon receipt, the addressee terminal checks the integrity of the sequence of the frames.

The connection architecture illustrated in FIG. 1 has the drawback of being heterogeneous. It therefore requires conversion gateways between the AFDX network and the field buses/networks used for connecting the different pieces of equipment.

A first solution would consist of directly connecting the different pieces of equipment to a frame switch of the AFDX network. However, given the large number of pieces of equipment on-board an aircraft, this would require the use of a large number of such switches. Further, as the switches are traditionally located in avionics racks, in other words generally far from the sensors/actuators, this solution would involve the use of many long wire connections, which would be detrimental to the mass balance of the craft.

An object of the present invention is therefore to propose an architecture with which a large number of on-board pieces of equipment may be connected to the AFDX network without having the aforementioned drawbacks.

Another object of the present invention is to propose a frame switching device with which several on-board pieces of equipment may be connected together and allowing them if necessary to have access to the AFDX network.

DISCUSSION OF THE INVENTION

The present invention is defined by a frame switching device for an AFDX network, comprising a first port, intended to be connected to a switch of said network or to a terminal, and a plurality of second ports intended to be respectively connected to on-board pieces of equipment. Said device operates in the following way:

each incident frame on the first port is replicated on each of said second ports;
said second ports are periodically polled in turn, each frame present on a second polled port being transferred onto said first port.

Preferably, each incident frame on the first port is replicated on each of the second ports gradually as it is received on the first port.

Each second port is advantageously associated with an input buffer in which are stored the frames incident on this port, each port being polled by checking whether the buffer with which it is associated contains a frame, if yes, said frame being emptied from said buffer in order to be transmitted onto said first port. Each second port is typically polled with a polling period $\tau \leq 500$ μs.

The total time for emptying an input buffer and transmitting it onto the first port is advantageously selected to be less than $\tau/N$ wherein $\tau$ and $N$ are the polling period and the number of second ports, respectively.

Preferably, said input buffers have a size of $(\tau/N)D$ bits wherein $D$ is the binary throughput on the first port.

The invention is also defined by an on-board system comprising a plurality of pieces of equipment respectively connected to the second ports of a frame switching device as defined above, each piece of equipment being configured so as to only transmit at most one frame every 500 μs. Further, each piece of equipment is typically configured for transmitting said frame within a time of less than 500 µs.

The invention also relates to a frame switching device for connecting a plurality of on-board pieces of equipment together and/or to a computer, comprising a plurality (N) of input/output ports intended to be connected to said pieces of equipment or to said computer via Ethernet links, said device comprising means for replicating frames polling in turn said input ports, each input port being polled with a determined polling period, and copying out every frame which is incident on an input port, on all the output ports.

The invention finally relates to a frame switching device for connecting a plurality of on-board pieces of equipment together and/or to a computer, said device comprising a plurality of elementary frame switching devices (P), each elementary device including a plurality (N) of input/output ports intended to be connected to said pieces of equipment, to said computer or to another elementary switching device via Ethernet links, each elementary switching device comprising means for replicating frames polling said input ports, each input port being directly connected to a piece of equipment or to the computer, said first input port being polled with a first determined period, each input port being connected to another elementary switching device, said second input port being polled with a second period shorter than the first, the replication means copying out any frame incident on a first input port, on all the output ports and copying any incident frame on a second input port, on all the output ports except for the one associated with the latter.

DETAILED DISCUSSION OF PARTICULAR EMBODIMENTS

A first idea at the basis of the invention consists of connecting the different on-board pieces of equipment to the AFDX network 230, without any conversion gateway, by means of a simpler frame switching device than a conventional frame switch. This switching device may be located in proximity to the sensors/actuators to which it is connected.

Figure 2A:
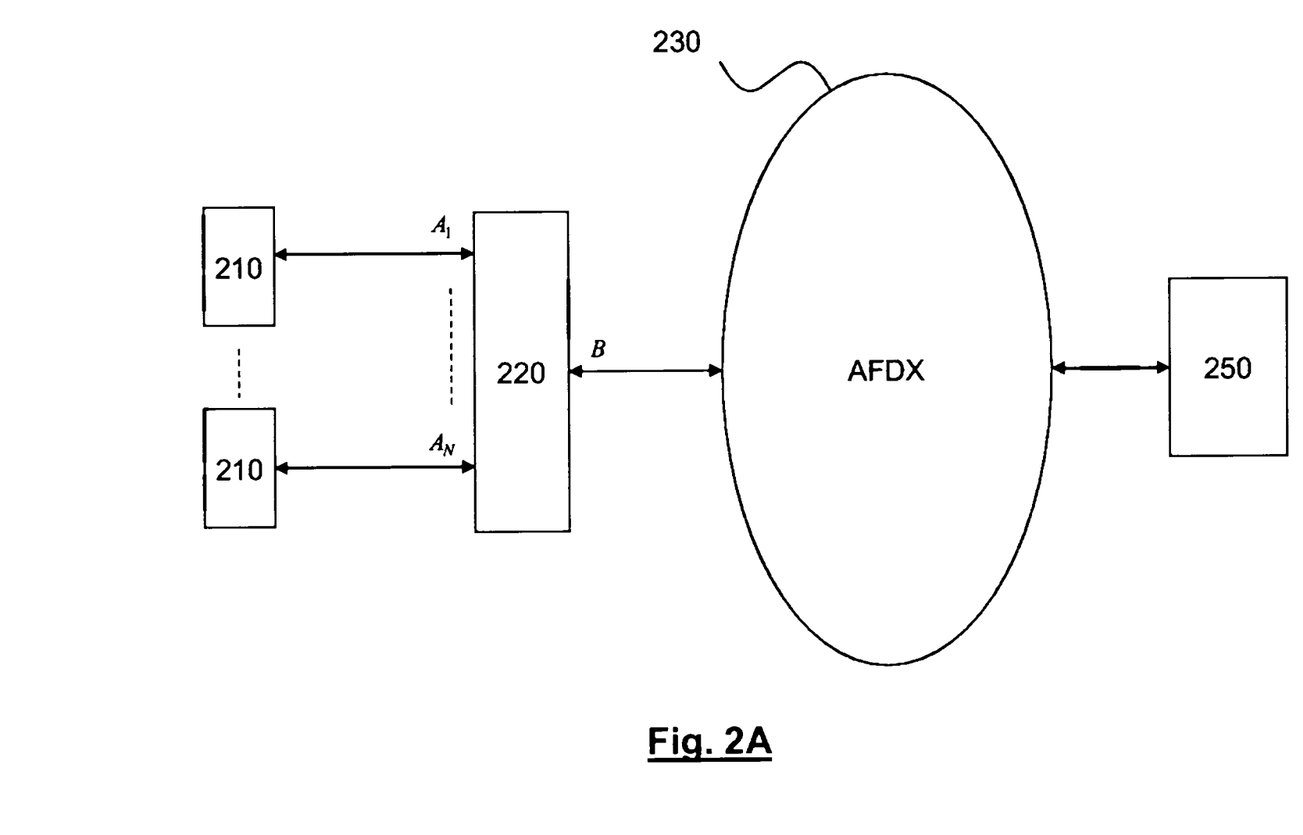
FIG. 2A illustrates an architecture for connecting a plurality of pieces of equipment to the AFDX network, according to a first alternative embodiment of the invention.

FIG. 2A illustrates a connection architecture according to an embodiment of the invention. The on-board pieces of equipment 210, for example sensors or actuators, are directly connected to a frame switching device 220. This device may be connected either to a conventional switch, SW, of the network 230, or directly to the computer (host machine) 250. More specifically, the device 220 comprises N input/output ports, $A_1, \ldots, A_N$, respectively connected to the N on-board pieces of equipment 210 on the one hand, and an input/output port, B, connected to a port of the switch SW or, directly to the computer 250 on the other hand. It is important to note that the switching device 220 is part of the AFDX network 230 in the same way as the conventional frame switch SW. The on-board pieces of equipment 210 and the computer 250 are terminals (End Systems) in the sense of the Arinc 664 standard. In any case, the data are transmitted between the pieces of equipment 210 and the computer 250 by means of one or more virtual links, as this will be seen in detail later on.

Figure 2B:
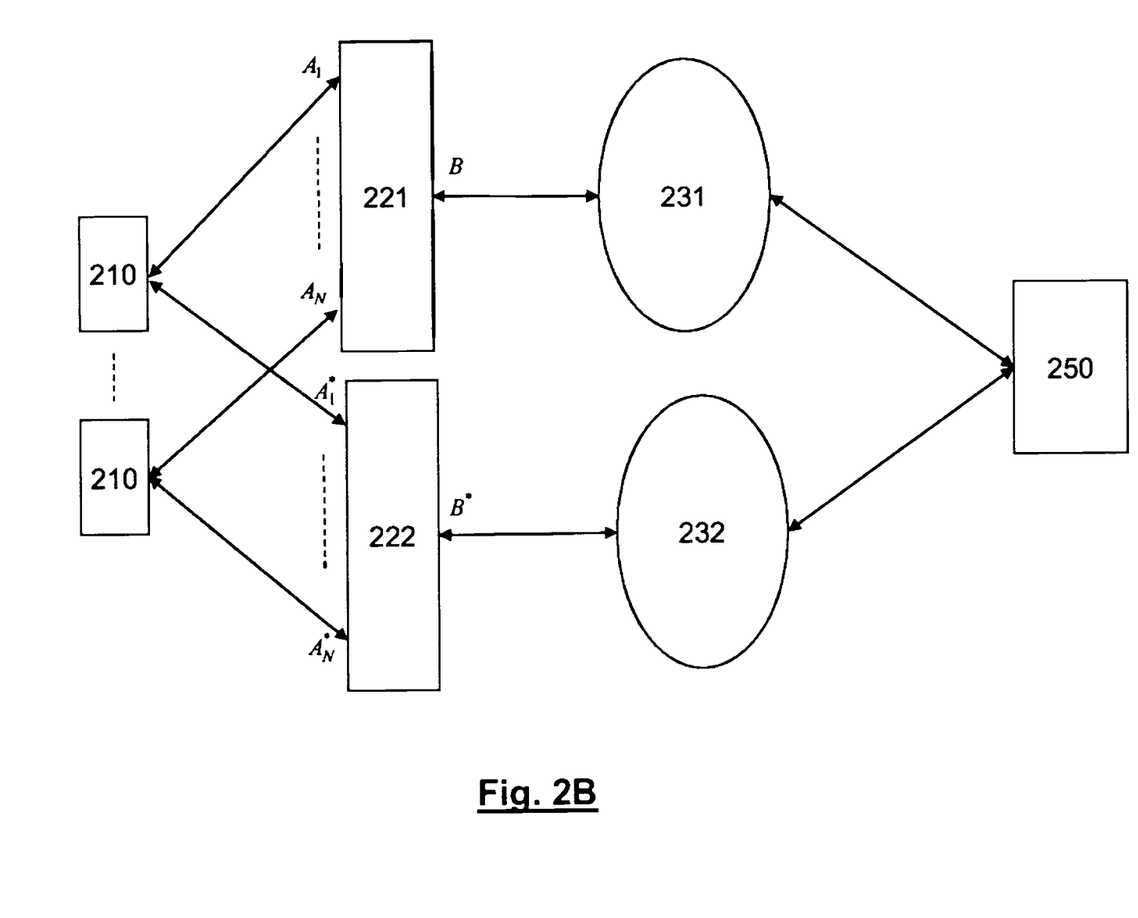
FIG. 2B illustrates an architecture for connecting a plurality of pieces of equipment to the AFDX network, according to a second alternative embodiment of the invention.

According to an alternative embodiment, illustrated in FIG. 2B, the AFDX network is made redundant, i.e. it consists of a first network 231, comprising a first switching device 221 and of a second network 232, comprising a second switching device 222, the first and second switching devices are identical with the one illustrated in 220 in FIG. 2A. Within each network, the switching device 221, 222 is either connected to a frame switch of this network, or directly to the computer 250. When a frame of data has to be transmitted by the computer 250, two identical copies of this frame are then sent in parallel on both networks, and reach the addressee piece of equipment via the first and second connection devices. The addressee piece of equipment only keeps the first received frame. Vice versa, when a frame of data has to be transmitted by an on-board piece of equipment 210 to the computer 250, two copies of this frame are transmitted via the first and second switching devices, respectively on both networks. In the same way as earlier, only the first received frame is kept.

The on-board pieces of equipment 210 are configured so as not to transmit more than one frame per time period $\Delta\tau_{jitter}^{max}$ wherein $\Delta\tau_{jitter}^{max}$ is the maximum allowed jitter for a terminal (End System) in the AFDX network, in the present state of the standard, $\Delta\tau_{jitter}^{max}=500$ µs.

Figure 3:
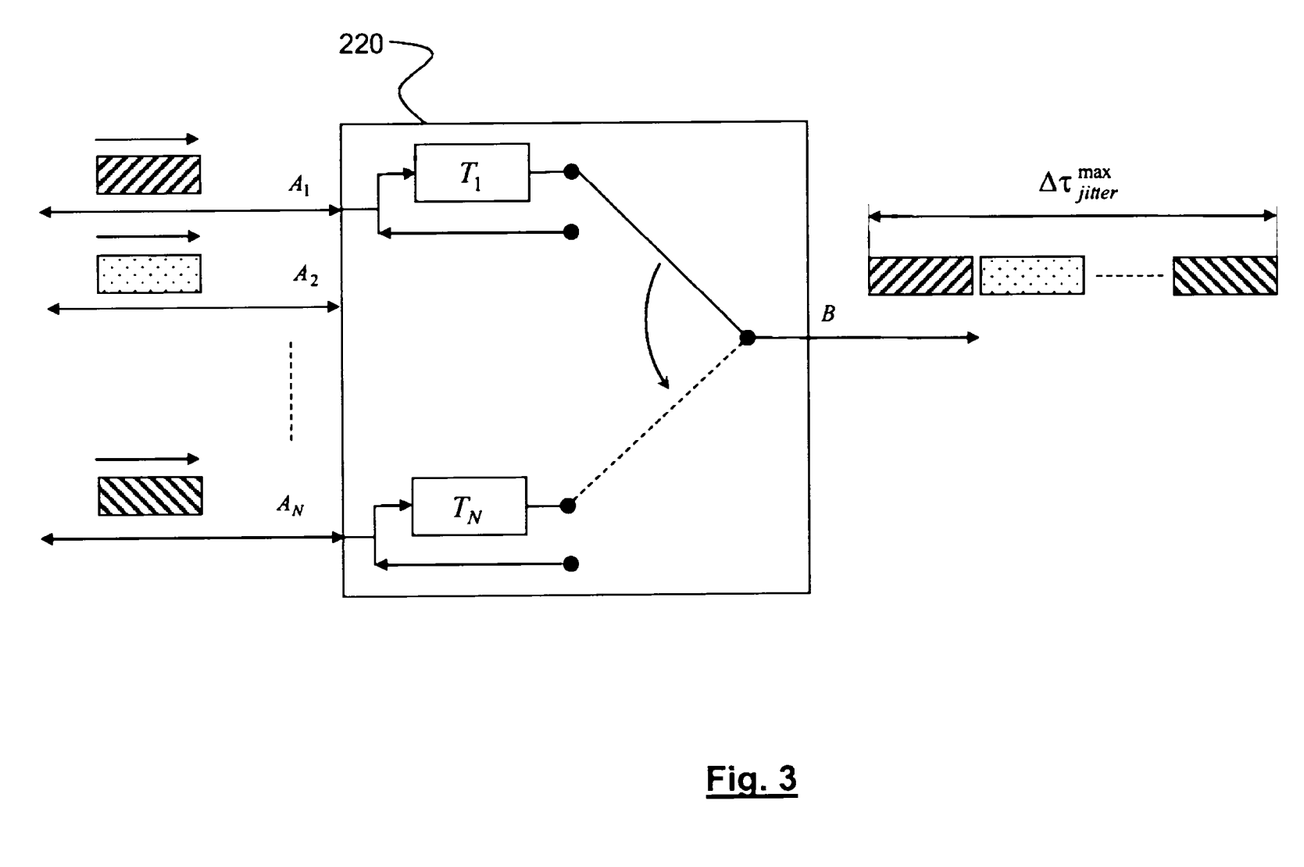
FIG. 3 schematically illustrates the operation of a frame switching device according to a first embodiment of the invention, in the case of an uplink.

FIG. 3 illustrates the operation of a frame switching device according to the invention in the case of an uplink, i.e. when the pieces of equipment 210 transmit frames to the on-board computer 250.

Each of the input/output ports $A_1, \ldots, A_N$ is associated with an input buffer and optionally with an output buffer (not shown). The input/output port B is optionally associated with an input buffer and/or an output buffer (not shown). The input buffers, and if necessary the output buffers, are memory buffers, which may for example be made as registers or memory areas of a RAM.

Each input/output port $A_n$ is connected to a piece of equipment 210, for example by means of a dual twisted pair, one pair for the uplink and one pair for the downlink. Also, the input/output port B is connected to a switch of the network, or else directly to the on-board computer, for example by means of a dual twisted pair. Optical links may be used instead of twisted pairs.

The frames received on the N ports $A_1, \ldots, A_N$ are respectively stored in the N input buffers $T_1, \ldots, T_N$, with a predetermined size L, as specified later on. If a frame is received on the port $A_n$ then the associated buffer $T_n$ already contains a frame, the latter is simply deleted (the writing starting at the same address). Also, if an incident frame has a length greater than L, this frame is in fact truncated to the length L, upon writing into the buffer.

The buffers $T_1, \ldots, T_N$ are each emptied in turn on the B port with a periodicity of $\tau \leq \Delta\tau_{jitter}^{max}$. Thus, for a given piece of equipment transmitting frames over a virtual link with a minimum space-time constraint BAG (Bandwidth Allocation Gap), the output frames of the switching device will have a maximum jitter $\Delta\tau_{jitter}^{max}$ relatively to the possible transmission instants over the virtual link $t_0+BAG, t_0+2BAG, t_0+3BAG, \ldots$ wherein $t_0$ is an arbitrary time reference. Indeed, a frame stored in an input buffer of the switching device will wait for at most $\Delta\tau_{jitter}^{max}$ before being transmitted over the network.

Figure 5:
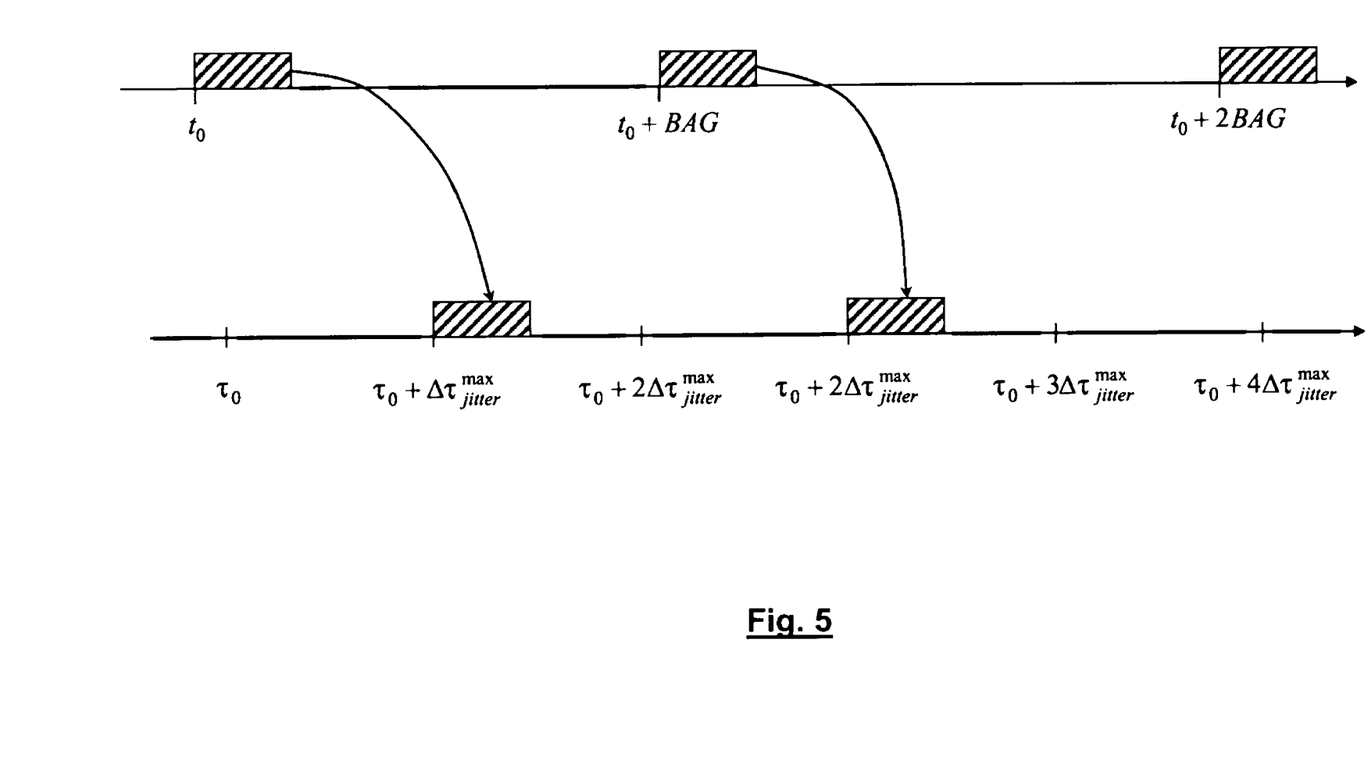
FIG. 5 illustrates the time constraints relating to a virtual link from an on-board piece of equipment and in transit through a frame switching device according to the invention.

This situation is illustrated in FIG. 5, where the possible transmission instants $t_i=t_0+i.BAG$ for the relevant virtual link are illustrated on a first time axis, and the instants for emptying the input buffer on the output port, $\tau_k=\tau_0+k\Delta\tau_{jitter}^{max}$ are illustrated on a second time axis. If a frame F is present in the buffer $T_n$ just before instant $\tau_k$, this frame is transferred at instant $\tau_k$ onto the output port B. On the other hand, if a frame F is present in the buffer $T_n$ just after this instant, it will only be transferred at instant $\tau_{k+1}$. The delay $\theta_i$ introduced by the switching device is therefore always less than the maximum tolerated jitter $\Delta\tau_{jitter}^{max}$.

For each input buffer, the total time for emptying a frame and for transmitting this frame onto the port B should be selected to be less than $\tau/N$. Thus, the emptying of a buffer will be completed before passing to the next buffer. The size L is advantageously selected to be equal to $(\tau/N)D$, wherein D is the output binary throughput of the port B.

The switching device does not perform any reading of the frame header and a fortiori not any CRC checking. The frame is simply transferred by copying it out onto the port B. In other words, an incident erroneous frame will be transmitted as such, without any processing or rejection by the switching device. In particular, a truncated frame, therefore having an erroneous CRC, will be transmitted as such. The final addressee will reject the erroneous/truncated frame upon checking the CRC.

If a piece of equipment does not observe the transmission constraints, for example if it transmits frames with a lower periodicity than $\Delta\tau_{jitter}^{max}$, a frame from the piece of equipment may delete a preceding frame in the buffer before it is emptied. This however has no incidence on the fate of the data frames transmitted by the other pieces of equipment.

Figure 4:
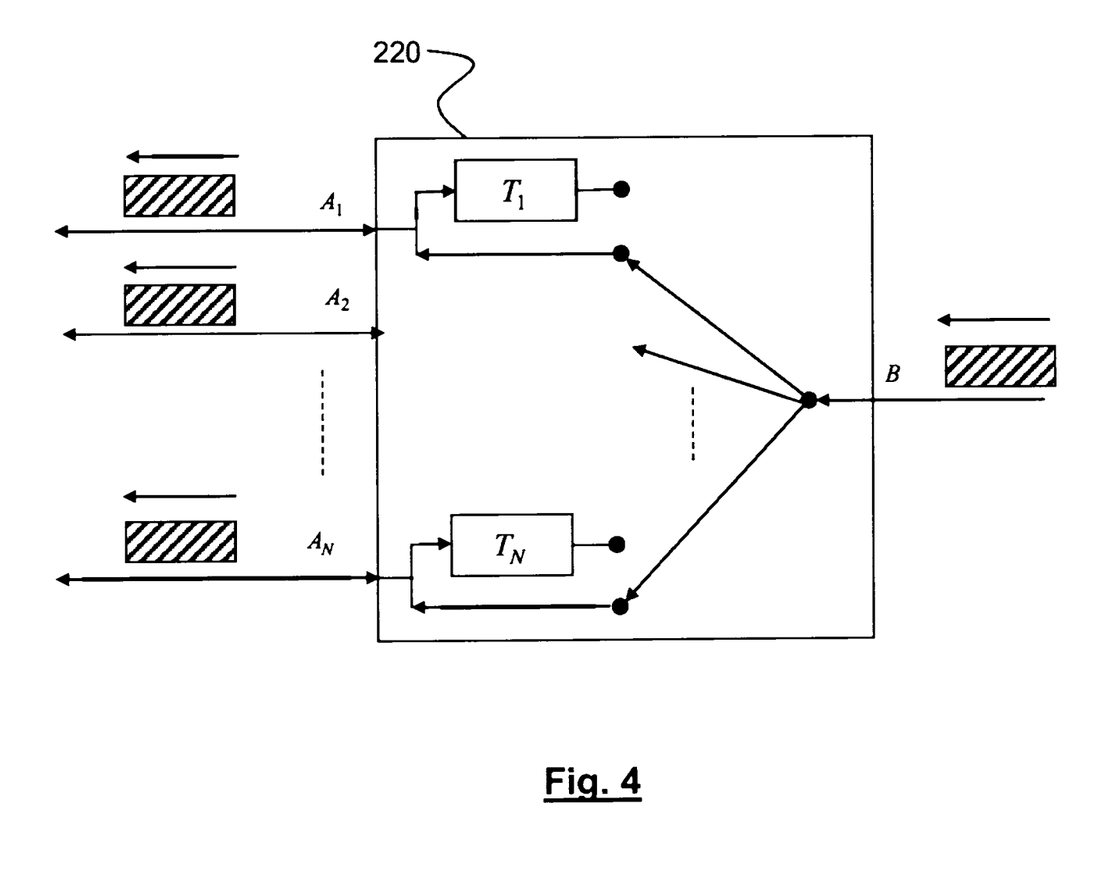
FIG. 4 schematically illustrates the operation of a frame switching device according to a first embodiment of the invention, in the case of a downlink.

FIG. 4 illustrates the operation of the switching device in the case of a downlink, i.e. when the pieces of equipment 210 receive frames from the on-board computer 250.

Unlike with the uplink, the switching device here plays a simple hub role. In other words, any incident frame on the port B is automatically replicated on the ports $A_1, \ldots, A_N$ of the switching device. This replication is advantageously carried out gradually as the incident frame is received, without any storage in a buffer or any checking of its CRC. The incident frame is therefore not subject to a contention time at the switching device, only a delay inherent to the replication operation.

When a virtual link has for addressee one of the pieces of equipment 210, the routing of the virtual link through the network does not require that the output port of the device 220 be known, to which this piece of equipment is connected. Indeed, a data frame making its way over this virtual link will be broadcast by the switching device to all the pieces of equipment which are connected to it. However, each piece of equipment which has not subscribed to this virtual link will reject the frame by noticing that the specified identifier of the virtual link in this frame is unknown to it. Eventually, only the addressee(s) of the relevant virtual link will keep the relevant frame.

The architecture of the switching device as described above is particularly simple and robust. In particular, the error-tracking function on the uplinks and downlinks as well as the switching function on the downlink are remotely deployed on the terminals. In spite of this simplicity, the switching according to the invention allows the different pieces of equipment to be the source or the addressee of a virtual link and of having services attached to the AFDX network, in order to notably benefit from test tools, from troubleshooting diagnostics, to upload software packages used on this network.

We shall indicate hereafter a digital exemplary embodiment of the switching device 220.

We shall assume that the switching device is connected to 5 on-board pieces of equipment by means of 10 Mbits/s links. In other words, each piece of equipment can only transmit a frame of 125 bytes every $\Delta\tau_{jitter}^{max}=500$ μs. These 125 available bytes should be assigned as follows: 12 bytes are to be dedicated to the field IFG for the inter-frame gap, 7 bytes to the preamble, 1 byte for delimiting the beginning of a frame or SFD (Start Frame Delimiter), 14 bytes to the Ethernet header, 20 bytes for IP header, 8 bytes to the UDP header, 1 byte to the sequence number, 4 bytes to the error check (FCS). The frame may therefore eventually only contain 58 bytes of payload.

Thus, if a piece of equipment is the source of a virtual link associated with a time spacing BAG of 1 ms (the smallest time space presently contemplated by the AFDX standard), the piece of equipment may transmit 58 bytes every ms, i.e. a guaranteed bandwidth of 464 kbits/s on this link. The minimum inter-frame gap being 500 μs, the piece of equipment may support two virtual links of 464 kbits/s, i.e. a total guaranteed bandwidth of 928 kbits/s. The latter is reserved for the relevant piece of equipment and is not shared with the other pieces of equipment connected to the switching device. Simultaneously, the piece of equipment may receive frames on the downlink.

It is also possible to show that in this case the maximum latency time between the piece of equipment and the on-board computer is of the order of 1.5 ms on the downlink and of 2 ms on the uplink.

Figure 6A:
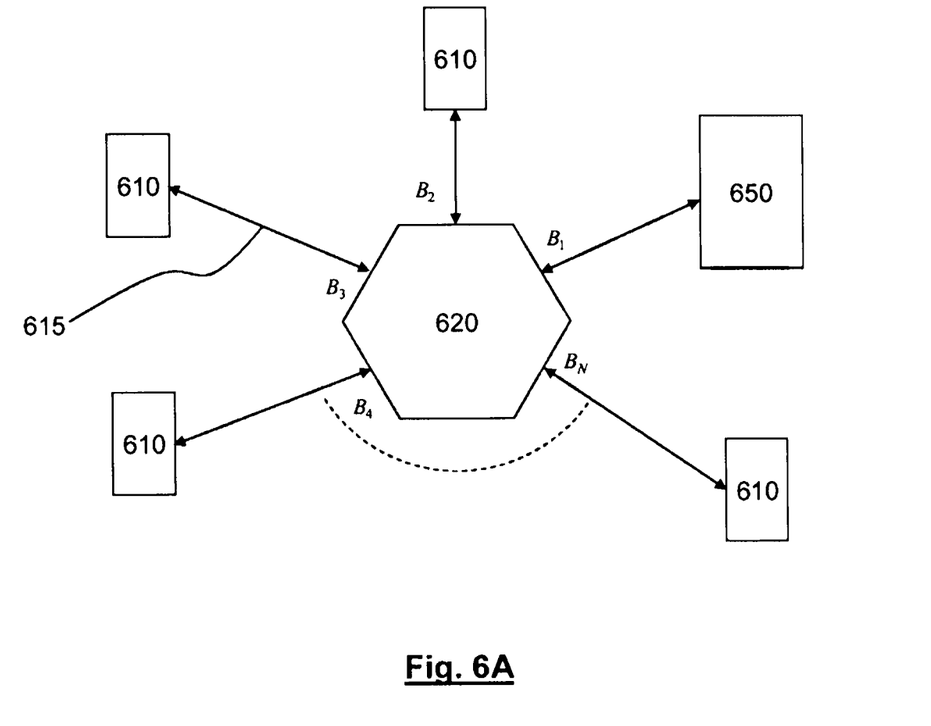
FIG. 6A schematically illustrates an architecture for connecting a plurality of on-board pieces of equipment according to a third alternative of the invention.

FIG. 6A illustrates an architecture for connecting a plurality of on-board pieces of equipment according to a third alternative embodiment of the invention. With this alternative, several on-board pieces of equipment 610 may be connected together, and if necessary they may be connected to a host machine (computer), either directly or through an AFDX network.

Unlike the previous alternatives, the relevant pieces of equipment are connected together through a frame switching device 620. Again it is assumed that each piece of equipment 610 is capable of transmitting frames with a constraint of minimum time interval (BAG). Each piece of equipment 610 is connected to an input/output port $B_n$, n=1, . . . , N of the device 620 by means of an Ethernet link, 615. One of the input/output ports of the switching device may be connected to the computer or to a frame switch of an AFDX network. In the latter case, the different pieces of equipment have access to the network through the switching device 620. It should be noted that the Ethernet links 615 are not part here of the AFDX network and that therefore the Ethernet frames transmitted over these links do not necessarily comply with the format of the Arinc 664 standard. In particular, the frames transmitted over these links do not necessarily have to observe the maximum jitter constraint $\Delta\tau_{jitter}^{max}$.

Figure 7A:
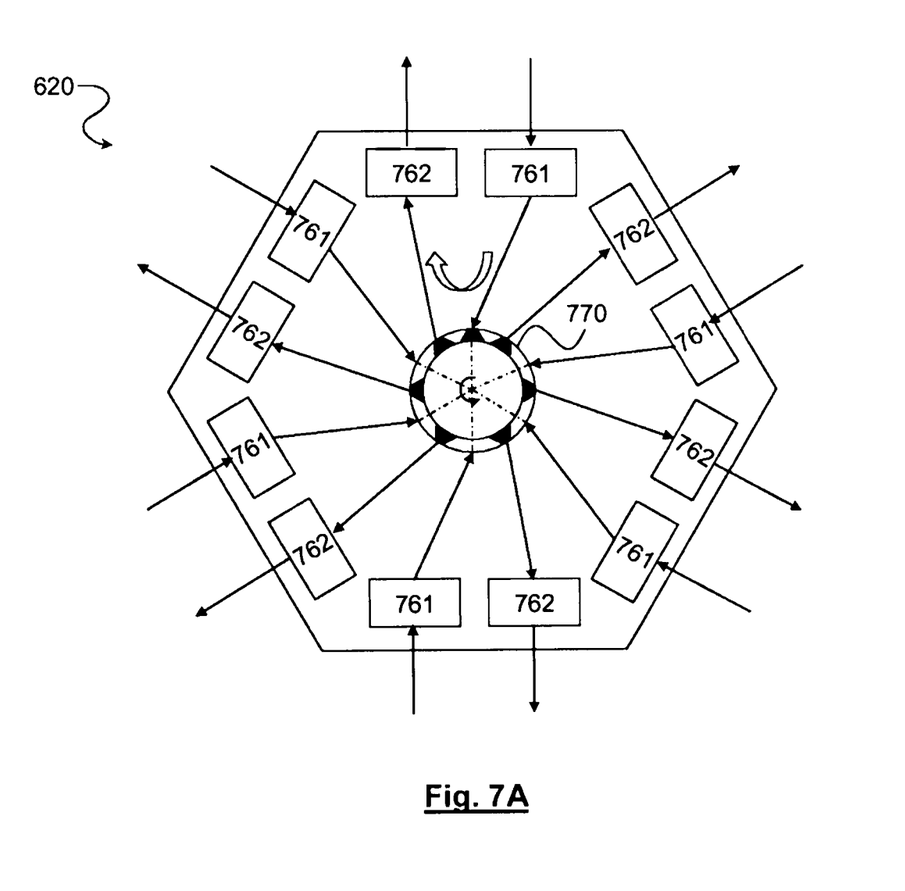
FIG. 7A schematically illustrates a frame switching device according to a second embodiment of the invention.

FIG. 7A schematically illustrates the structure of the switching device 620. This device comprises N input ports 761 and N output ports 762. The input ports 761 each comprise an input buffer of sufficient size for storing an incident frame. The output port 762 may either comprise an output buffer or not. In the latter case, the frame is directly transmitted over the link connected to the output port.

The switching device further comprises replication means 770, symbolically illustrated as a rotary switch with N positions. These replication means 770 copy out any frame incident on one of the input ports $B_k^{in}$, on all the output ports $B_l^{out}$, l=1, . . . , N. More specifically, the means 770 in turn poll the different input ports and transmit any frame present on an input port, onto each of the output ports, including on the one associated with the input port having received the incident frame. An input port is polled, i.e. its input buffer is read, with a periodicity τ, in other words the device 620 performs a switching cycle of duration τ. It is important to note that the operation of the frame switching device is that of a hub with remarkable differences in that it operates synchronously, by periodic polling of its input ports.

there is no collision of frames.

The polling period, τ, should further observe the following constraints:

$$T = \sum_{i=1}^{N} T_i < \tau < BAG$$

wherein BAG is, as this has been stated, the minimum time gap between two frames transmitted by a piece of equipment, and $T_i$ the time required for transmitting the longest frame transmitted by a piece of equipment connected to the port $B_i$ of the switching device.

For example, if the number of ports of the switching device is N=8, the binary throughput D=100 Mbits/s, the length of the payload is L=100 bytes, the length of the MAC/IP/UDP+ CRC header is I=46 bytes, the minimum gap between two Ethernet frames (IFG+preambule) is E=20, T=N(L+I+E)·8/ D=106.24 µs and if BAG=500 µs, a polling period of τ=490 µs may be selected.

Figure 6B:
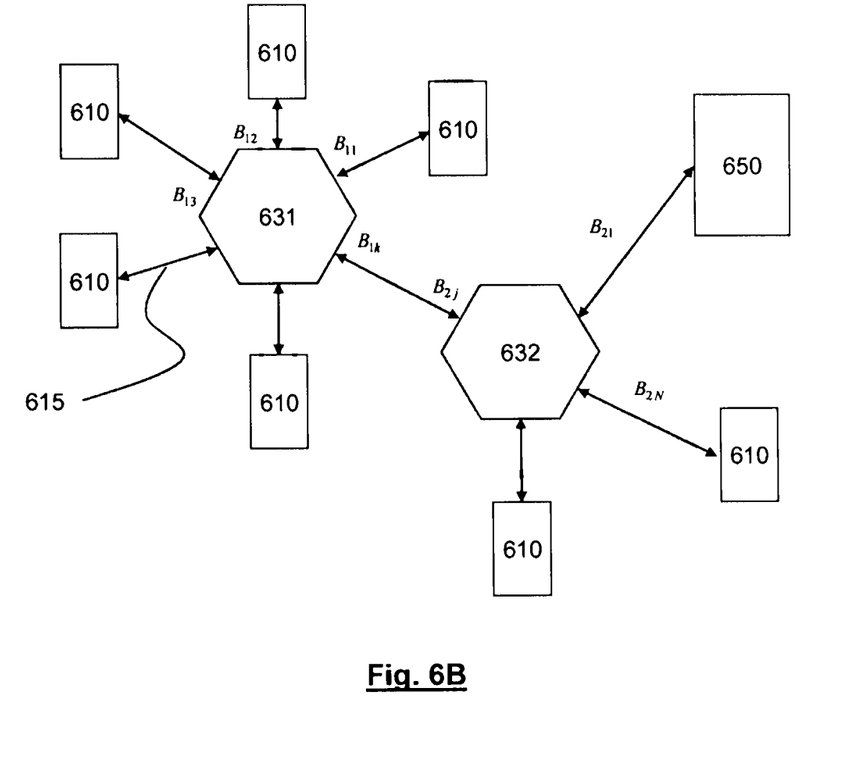
FIG. 6B schematically illustrates an architecture for connecting a plurality of on-board pieces of equipment according to a fourth alternative of the invention.

FIG. 6B illustrates an architecture for connecting a plurality of on-board pieces of equipment according to a fourth alternative embodiment of the invention.

This alternative differs from the previous one in that it comprises a plurality P of elementary switching devices, here 631, 632, which are connected in cascade, each elementary device including N input/output ports and the whole device providing for connection of at most P(N−1) on-board pieces of equipment together. The device may also connect on-board pieces of equipment to a computer 650 either by direct connection to an input/output port ($B_{21}$), as illustrated, or through an AFDX network.

Advantageously, the on-board pieces of equipment and/or the elementary switches are powered by the Ethernet network, the twisted pair being then used both for a power supply and for transmitting data. This technique is known under the name of PoE (Power over Ethernet) and described in the IEEE 802.af standard. In this way, provision may not be made for separate power supply buses and the mass balance of the device may be improved. It will be noted that this technique a fortiori applies to the architecture of FIG. 6A.

Figure 7B:
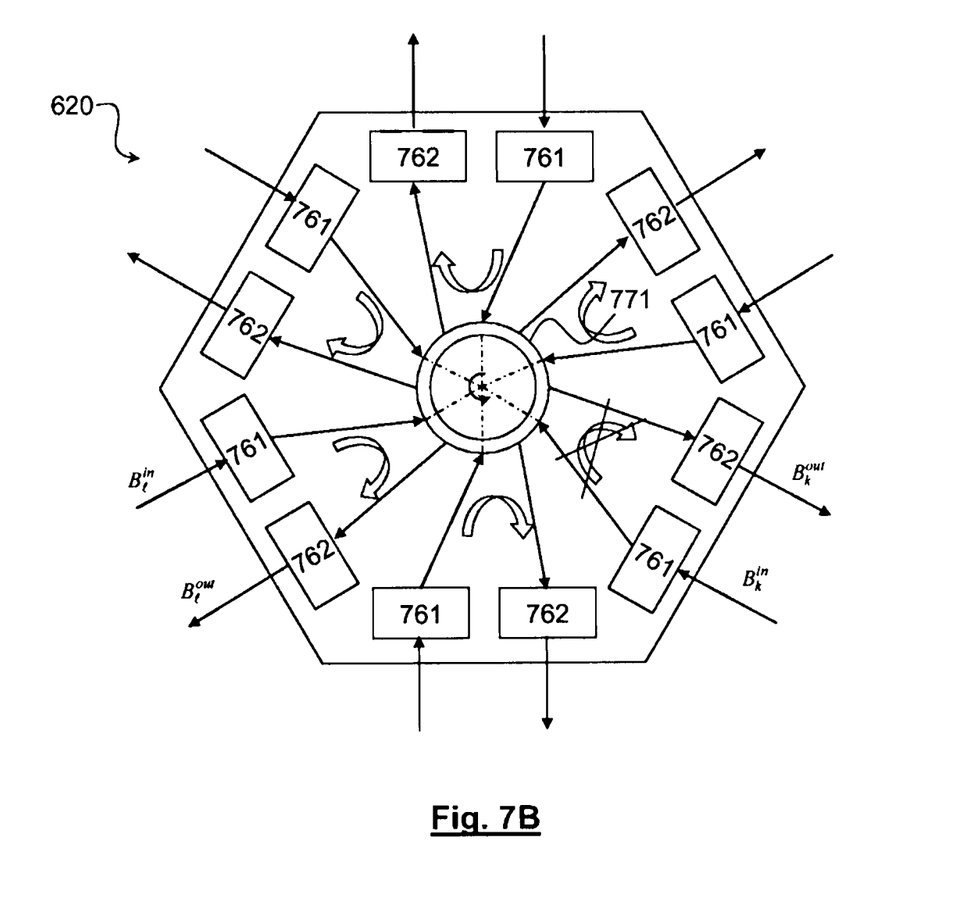
FIG. 7B schematically illustrates a frame switching device according to a second embodiment of the invention.

FIG. 7B schematically illustrates the structure of elementary switching device used in the architecture of FIG. 6B. Such a device is similar to the one illustrated in FIG. 7A, identical elements bearing the same reference signs. However it is distinguished by the function of the replication means 771. Indeed, if an architecture with two elementary devices 631 and 632 is considered, as illustrated in FIG. 6B, and if $B_{1k}^{in}$ and $B_{2k}^{out}$ denote respectively the input and output parts of the first device connecting it to the second, the input port $B_{1k}^{in}$ will be polled N−1 times more frequently than the other ones. More specifically, if the polling period of $B_{1l}^{in}$, l≠k is τ wherein τ is the polling period, determined for the non-cascaded elementary device, the polling period of $B_{1k}^{in}$ is less than or equal to τ/N−1, the flux of incident frames on the port $B_{1k}^{in}$ being N−1 times higher than on the other ports. More generally, if P is the number of elementary devices mounted in series, the polling period of the input port(s) ensuring the interconnection with another elementary device will be less than or equal to $\tau/(N-1)^{P-1}$.

The replication means 771 also differ from the previous means 770 in that they do not perform copying out of the input port $B_{1k}^{in}$ onto the output port $B_{2k}^{out}$. Also, for the switching device 632, there is no copying out of $B_{2j}^{in}$ on $B_{2j}^{out}$ and more generally, local copying out is prohibited for any port ensuring an interconnection between two elementary switching devices. By prohibiting any local copying out for the relevant ports, it is possible to avoid infinite feedback between elementary switching devices.

We shall give a numerical example hereafter in the case illustrated in FIG. 6B of two elementary devices in a cascade, i.e. P=2. It is assumed as earlier that N=8, D=100 Mbits/s, L=100 bytes, and I=46 bytes, the minimum spacing between two Ethernet frames (IFG+preambule) is E=20. The minimum time T for transmitting all the incident frames is 14 (100+46+ 20)·8/100=185.92). If BAG=500 µs, a polling time τ of 490 µs may be assumed for the input ports directly connected to the pieces of equipment and a polling time τ' of 70 µs for the interconnection port with the other elementary switching device.

The invention claimed is:

1. A frame switching device for an AFDX network, comprising:

a first port, configured to be connected to a switch of the network or to a terminal; and a plurality of second ports configured to be respectively connected to a plurality of on-board pieces of equipment, wherein each incident frame on the first port is replicated on each of the second ports as it is received on the first port, wherein the second ports are periodically polled in turn, each frame present on a second polled port being transferred onto the first port, and wherein each second port is associated with an input buffer in which are stored the incident frames on the second port, each port being polled by checking whether the buffer with which it is associated contains a frame, and if yes, the frame being emptied from the buffer to be transmitted onto the first port, the total time for emptying the input buffer and transmitting it onto the first port being less than τ/N wherein τ and N are the polling period and the number of second ports respectively.

2. The frame switching device according to claim 1, wherein the input buffers have a size of (τ/N) D bits, wherein D is the binary throughput on the first port.

3. The frame switching device according to claim 1, wherein each second port is polled with a polling period $\tau \leq 500$ μs.

4. An on-board system comprising:
   a plurality of pieces of equipment respectively connected to the second ports of a frame switching device according to claim 3, each piece of equipment being configured to transmit at most one frame every 500 μs.

5. The on-board system according to claim 4, wherein each piece of equipment is configured to transmit the frame within a time of less than 500 μs.

6. The frame switching device according to claim 1, wherein each incident frame on the first port is replicated on each of the second ports as it is received on the first port.

7. A frame switching device for connecting a plurality of on-board pieces of equipment together and/or to a computer, the device comprising:
   a plurality of elementary switching devices in cascade, each elementary switching device including a plurality of input/output ports configured to be connected to the pieces of equipment, to the computer, or to another elementary switching device via Ethernet links,
   wherein each elementary switching device comprises means for replicating frames polling the input ports, each input port being directly connected to a piece of equipment or to the computer, the first input port being polled with a first determined period, each input port being connected to another elementary switching device, the second input port being polled with a second period shorter than the first, the replication means copying out any frame incident on a first input port, on all the output ports and copying out any frame incident on a second input port, on all the output ports except for the one associated with the latter, wherein the second polling period ($\tau'$) being less than or equal to $\tau/(N-1)$, and $\tau$ is the first polling period and N is the number of input/output ports of an elementary switching device.

8. The frame switching device according to claim 7, wherein at least some of the Ethernet links comply with the IEEE 802.af standard.

\* \* \* \* \*